E. HARDING.
MACHINE FOR WINDING HAY INTO ROLLS FOR FUEL.
No. 189,097. Patented April 3, 1877.
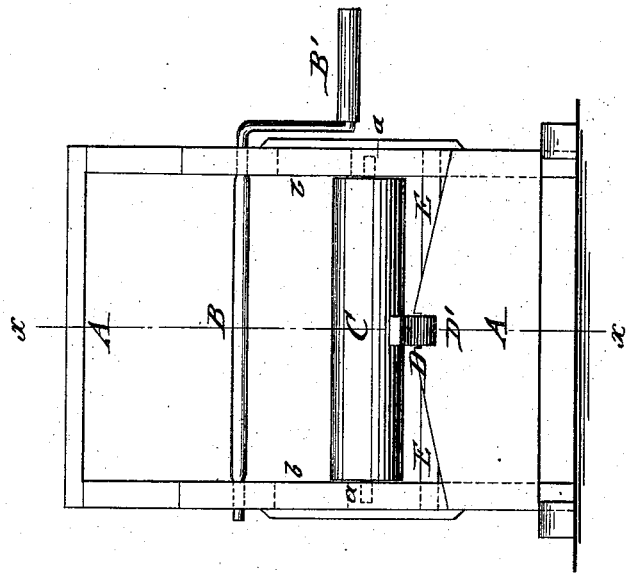
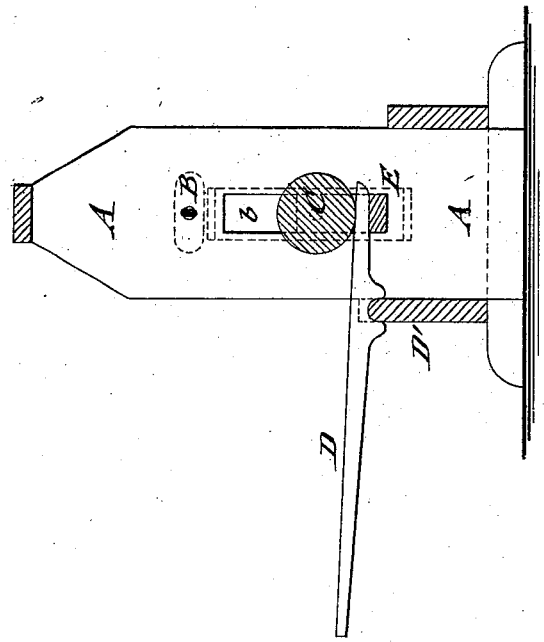

UNITED STATES PATENT OFFICE.

EBENEZER HARDING, OF DELAVAN, MINNESOTA.

IMPROVEMENT IN MACHINES FOR WINDING HAY INTO ROLLS FOR FUEL.

Specification forming part of Letters Patent No. 189,097, dated April 3, 1877; application filed January 19, 1877.

*To all whom it may concern:*

Be it known that I, EBENEZER HARDING, of Delavan, in the county of Faribault and State of Minnesota, have invented a new and Improved Machine for Winding Hay into Rolls, of which the following is a specification:

In the accompanying drawing, Figure 1 represents a vertical transverse section on line $x\ x$, Fig. 2, and Fig. 2 a front elevation, of my improved machine for winding hay into rolls.

Similar letters of reference indicate corresponding parts.

The invention relates to a machine for winding hay or straw into rolls or twists for the purpose of using the same in a compact and convenient form for fuel; and the invention consists of a flat revolving spindle, in combination with a sliding and lever-acted pressure-roller, the hay being wound upon the spindle, which is withdrawn when the roll is finished.

In the drawing, A represents the supporting-frame of my improved machine for winding or rolling hay or straw for utilizing the same for fuel.

Frame A is clamped or otherwise attached to a table or other support, and arranged with laterally-braced side standards, that carry, in suitable bearings, a spindle, B, and below the same a pressure-roller, C. The spindle B is provided at one end with a crank, B', outside of frame A, by which the spindle is revolved to wind up the hay or straw fed to the same.

The spindle B is preferably made of flat shape, inside of frame A, to facilitate the holding of the ends in starting the roll.

The pressure-roller C turns in bearings $a$, sliding in guide-recesses $b$ of the side standards of frame A, and is acted upon by a hand-lever, D, that is fulcrumed to a lateral front piece, D', of frame A. The roller C and inner end of lever D rest on a cross-piece, E, seated in the recesses $b$, when not carried up against the hay. The hand-lever D bears on the under side of roller C, and presses the same firmly against the hay as the same winds around the spindle.

After the hay is attached to the spindle by being wound once or twice around the same, the spindle is revolved by one hand, and the roller pressed at the same time tightly by the lever, with the other hand, against the hay, so as to form a closely-wound roll of hay or straw, of any desired size, around the spindle.

When the hay has the required size, the spindle is withdrawn, by pulling the crank sidewise, and the roll removed. The next roll is then formed in the same manner, and thus any quantity of the surplus hay or straw is worked up quickly into rolls of compact shape, which may be used in convenient manner as fuel, in place of wood, and burned in any stove, the machine furnishing thus to the farmers in prairie countries a cheap, simple, and readily-operated device for compressing hay, straw, and similar articles into small space, and using the same for fuel.

Having thus described my invention, I claim as new and desire to secure by Letters Patent—

The combination, in frame A, of the spindle B, roll C, lever D, and support E, to condense hay or straw into convenient form for fuel, as described.

EBENEZER HARDING.

Witnesses:
WM. W. BROWN,
H. HARDING.